United States Patent
Bao et al.

(10) Patent No.: US 11,582,662 B2
(45) Date of Patent: Feb. 14, 2023

(54) METHOD FOR CELL SELECTION, USER EQUIPMENT AND NETWORK SIDE EQUIPMENT

(71) Applicant: VIVO MOBILE COMMUNICATION CO., LTD., Guangdong (CN)

(72) Inventors: Wei Bao, Dongguan (CN); Yumin Wu, Dongguan (CN); Ran Yue, Dongguan (CN)

(73) Assignee: VIVO MOBILE COMMUNICATION CO., LTD., Chang'an Dongguan (CN)

(*) Notice: Subject to any disclaimer, the term of this patent is extended or adjusted under 35 U.S.C. 154(b) by 0 days.

(21) Appl. No.: 17/143,992

(22) Filed: Jan. 7, 2021

(65) Prior Publication Data

US 2021/0127312 A1    Apr. 29, 2021

Related U.S. Application Data

(63) Continuation of application No. PCT/CN2019/096325, filed on Jul. 17, 2019.

(30) Foreign Application Priority Data

Jul. 20, 2018   (CN) .......................... 201810805974.5

(51) Int. Cl.
  *H04W 36/08*   (2009.01)
  *H04W 36/00*   (2009.01)
  *H04W 36/06*   (2009.01)
  *H04W 48/20*   (2009.01)
  *H04W 84/04*   (2009.01)

(52) U.S. Cl.
  CPC ..... *H04W 36/08* (2013.01); *H04W 36/00837* (2018.08); *H04W 36/06* (2013.01); *H04W 48/20* (2013.01); *H04W 84/042* (2013.01)

(58) Field of Classification Search
  CPC combination set(s) only.
  See application file for complete search history.

(56) References Cited

U.S. PATENT DOCUMENTS 7,308,258 B2 * 12/2007 Demir ................. H04W 48/16
                                                             455/434
2009/0104905 A1    4/2009 DiGirolamo et al.
(Continued)

FOREIGN PATENT DOCUMENTS

| CN | 102714827 A | 10/2012 |
| CN | 104023362 A | 9/2014 |
| JP | 2010541428  | 12/2010 |
| JP | 2018078632 A | 5/2018 |

OTHER PUBLICATIONS

International Search Report and Written Opinion dated Feb. 4, 2021 as received in application No. PCT/CN2019/096325.
(Continued)

*Primary Examiner* — Marisol Figueroa
(74) *Attorney, Agent, or Firm* — Maschoff Brennan

(57) ABSTRACT

A method for cell selection, a user equipment and a network side device are provided. The method includes: reading, by a UE, first system information of a first cell on a first frequency; in a case that the first system information of the first cell indicates that camping on the first cell is not allowed and an intra-frequency reselection is not allowed and in a case that a set condition is met, the UE not selecting, or not reselecting, or neither selecting nor reselecting a cell on the first frequency.

17 Claims, 4 Drawing Sheets

(56) References Cited

U.S. PATENT DOCUMENTS

| | | |
|---|---|---|
| 2010/0265918 A1 | 10/2010 | Marinier |
| 2011/0039558 A1 | 2/2011 | Lee et al. |
| 2012/0289282 A1 | 11/2012 | Kobayashi et al. |
| 2015/0195755 A1* | 7/2015 | Gulati .............. H04W 36/0061 455/436 |
| 2018/0049030 A1 | 2/2018 | Manepalli et al. |
| 2020/0396619 A1* | 12/2020 | Kim ..................... H04W 24/10 |

OTHER PUBLICATIONS

"Access Restriction for MBMS" 3GPP TSG-RAN WG2 #78, R2-122564, Prague, Czech Republic, Mar. 26-30, 2012, LG Electronics Inc.

European Search Report dated Aug. 16, 2021 as received in application No. 19838114.7.

"Intra-frequency reselection indicator for CSG cells" 3GPP TSG-RAN WG2 #63bis, R2-085383, Prague, Czech Republic, Sep. 29, 2008. Qualcomm.

"Enabling the UE to camp on non-best cell" 3GPP TSG-RAN WG2 meeting #106, R2-1906277, Reno, Nevada, May 13, 2019. Intel Corporation.

Japanese Office Action dated Apr. 5, 2022 as received in application No. 2021-500991.

"Enabling the UE to camp on non-best cell" 3GPP TSG-RAN WG2 meeting #105bis, R21904437, Apr. 8, 2019, Intel Corporation.

Singapore Office Action dated Oct. 18, 2022 as received in application No. 11202100614T.

Huawei, LS on NR-PBCH Content, R2-1708065, 3GPP TSG-RAN WG2#99 Meeting Berlin, Germany Aug. 21-25, 2017.

Japanese Office Action issued in corresponding application No. 2021-500991, dated Nov. 4, 2022.

* cited by examiner

US 11,582,662 B2

METHOD FOR CELL SELECTION, USER EQUIPMENT AND NETWORK SIDE EQUIPMENT

CROSS REFERENCE OF RELATED APPLICATION

The present application is a continuation application of PCT Application No. PCT/CN2019/096325 filed on Jul. 17, 2019, which claims a priority of Chinese patent application No. 201810805974.5 filed on Jul. 20, 2018, which is incorporated herein by reference in its entirety.

TECHNICAL FIELD

The present disclosure relates to the field of mobile communications technologies, and in particular, to a method for cell selection, a user equipment and a network side device.

BACKGROUND

In future wireless communication systems, unlicensed bands (Unlicensed Bands) may be used as supplements to licensed bands (Licensed Bands) to help operators to expand the bands. In the related art, the selectable unlicensed bands are bands such as 2.4 GHz, 5 GHz, 37 GHz, and 60 GHz. Since the unlicensed band is shared by multiple Radio Access Technologies (RATs), such as Wireless Fidelity (WiFi), radar, Long Term Evolution (LTE), New Radio (New Radio, NR), etc., in some countries or regions, the unlicensed band must meet the specification when being used to ensure that all devices can fairly use the resource, such as listen before talk (Listen Before Talk, LBT), maximum channel occupancy time (Maximum Channel Occupancy Time, MCOT), etc. The LTE/NR communication systems working at the unlicensed band are respectively called LTE-U/NR-U.

In unlicensed bands, multiple operators may be networked in the same band. When a subscriber user equipment (User Equipment, UE) of an operator A selects a cell in an operating band, it may detect a Cell B of an operator B. After Cell B broadcasts that camping on the Cell B is not allowed and an intra-frequency reselection are not allowed, the UE may directly set a frequency of Cell B to be not selectable and/or not reselectable within a period of time. In this case, when the cell broadcast indicates that camping on the Cell B is not allowed and an intra-frequency reselection of the UE are not allowed while there are other cells that can be selected, or reselected, or selected and reselected on the frequency (for example, Cell A deployed by the operator, which is not prohibited from being camped on), the cells that can be selected, or reselected, or selected and reselected may be missed accordingly.

SUMMARY

The embodiment of the disclosure provides a method for cell selection, a user equipment and a network side device. The following presents a simplified summary in order to provide a basic understanding of some aspects of the disclosed embodiments. This summary is not an extensive overview and is intended to neither identify key/critical elements nor delineate the scope of such embodiments. The only purpose is to present some concepts in a simplified form as a prelude to the more detailed description that is presented later.

According to a first aspect of embodiments of the present disclosure, a method for cell selection is provided.

In some optional embodiments, the method includes:
reading, by a UE, first system information of a first cell on a first frequency;
in a case that the first system information of the first cell indicates that camping on the first cell is not allowed and an intra-frequency reselection is not allowed and in a case that a set condition is met, the UE not selecting, or not reselecting, or neither selecting nor reselecting a cell on the first frequency.

In some optional embodiments, the UE not selecting, or not reselecting, or neither selecting nor reselecting the cell on the first frequency includes: the UE not taking the cell on the first frequency as a candidate cell for cell selection, or cell reselection, or cell selection and reselection within a preset time period.

In some optional embodiments, the set condition is related to a preset PLMN set of the UE and a PLMN to which the first cell belongs.

In some optional embodiments, in the case that the first system information of the first cell indicates that camping on the first cell is not allowed and an intra-frequency reselection is not allowed and prior to determining whether the set condition is met, the method further includes: reading, by the UE, second system information of the first cell, to obtain the PLMN to which the first cell belongs.

In some optional embodiments, the set condition includes: at least one PLMN in the preset PLMN set of the UE is the same with at least one PLMN to which the first cell belongs.

In some optional embodiments, the preset PLMN set of the UE includes at least one or more of: a selected PLMN of the UE, a registered PLMN of the UE, a PLMN in an equivalent PLMN list of the UE, a home PLMN of the UE, and an equivalent home PLMN of the UE.

In some optional embodiments, the method further includes: in the case that the first system information of the first cell indicates that camping on the first cell is not allowed and an intra-frequency reselection of the UE is not allowed and in a case that the set condition is not met, the UE taking other cells on the first frequency as candidate cells for cell selection, or cell reselection, or cell selection and reselection.

In some optional embodiments, the method further includes: in a case that the first system information of the first cell indicates that camping on the first cell by the UE is allowed and in a case that the set condition is not met, the UE taking other cells on the first frequency as candidate cells for cell selection, or cell reselection, or cell selection and reselection.

In some optional embodiments, the UE is in an Idle state or an Inactive state.

In some optional embodiments, the first frequency is in an unlicensed band.

In some optional embodiments, prior to determining whether the set condition is met, the method further includes:
reading, by the UE, specific indication information in first system information, in a case that the specific indication information is valid and in the case that the first system information of the first cell indicates that camping on the first cell is not allowed and an intra-frequency reselection is not allowed, determining, by the UE, whether the set condition is met; in a case that the specific indication information is invalid and in the case that the first system information of the first cell indicates that camping on the first cell is not allowed and an intra-frequency reselection is not allowed, the UE not selecting, or not reselecting, or neither selecting nor reselecting a cell on the first frequency.

In some optional embodiments, it is determined that the set condition is not met in a case that the UE is unable to obtain a PLMN to which the first cell belongs.

In some optional embodiments, the first system information is a master information block (MIB), and the second system information is a system information block (SIB 1).

According to a second aspect of embodiments of the present disclosure, a method for cell selection is provided.

In some optional embodiments, the method includes:
generating first system information by a network side equipment;
broadcasting the first system information by the network side equipment, where the first system information is system information of a first cell on a first frequency and includes first indication information, second indication information and third indication information, the first indication information is configured to indicate whether camping on the first cell by a UE is not allowed, the second indication information is configured to indicate whether an intra-frequency reselection of the UE is not allowed, the third indication information includes a valid state and an invalid state, the third indication information of the valid state is configured to indicate determining whether a set condition is met in a case that camping on the first cell is not allowed and an intra-frequency reselection of the UE is not allowed, and not selecting, or not reselecting, or neither selecting nor reselecting a cell on the first frequency, in a case that the set condition is met, the third indication information of the invalid state is configured to indicate not selecting, or not reselecting, or neither selecting nor reselecting a cell on the first frequency in the case that camping on the first cell is not allowed and an intra-frequency reselection of the UE is not allowed. In some optional embodiments, the first system information is MIB.

According to a third aspect of the embodiments of the present disclosure, a user equipment is provided.

In some optional embodiments, the user equipment includes:
an information reading module, configured to read first system information of a first cell on a first frequency;
a cell selection module, configured to, in a case that the first system information of the first cell indicates that camping on the first cell is not allowed and an intra-frequency reselection is not allowed and in a case that a set condition is met, not select, or not reselect, or neither select nor reselect a cell on the first frequency.

In some optional embodiments, in a case that the cell selection module is configured to not select, or not reselect, or neither select nor reselect the cell on the first frequency, further including: the UE not taking the cell on the first frequency as a candidate cell for cell selection, or cell reselection, or cell selection and reselection within a preset time period.

In some optional embodiments, the set condition is related to a preset PLMN set of the UE and a PLMN to which the first cell belongs.

In some optional embodiments, in the case that the first system information of the first cell indicates that camping on the first cell is not allowed and an intra-frequency reselection is not allowed and prior to determining whether the set condition is met, the cell selection module is configured to: read second system information of the first cell, to obtain the PLMN to which the first cell belongs.

In some optional embodiments, the set condition includes: at least one PLMN in the preset PLMN set of the UE is the same with at least one PLMN to which the first cell belongs.

In some optional embodiments, the preset PLMN set of the UE includes at least one or more of: a selected PLMN of the UE, a registered PLMN of the UE, a PLMN in an equivalent PLMN list of the UE, a home PLMN of the UE, and an equivalent home PLMN of the UE.

In some optional embodiments, the cell selection module is further configured to: in the case that the first system information of the first cell indicates that camping on the first cell is not allowed and an intra-frequency reselection of the UE is not allowed and in a case that the set condition is not met, take other cells on the first frequency as candidate cells for cell selection, or cell reselection, or cell selection and reselection.

In some optional embodiments, the cell selection module is further configured to: in a case that the first system information of the first cell indicates that camping on the first cell is allowed and in a case that the set condition is not met, take other cells on the first frequency as candidate cells for cell selection, or cell reselection, or cell selection and reselection.

In some optional embodiments, the UE is in an Idle state or an Inactive state.

In some optional embodiments, the first frequency is in an unlicensed band.

In some optional embodiments, the information reading module is configured to read specific indication information in first system information, in a case that the specific indication information is valid and in the case that the first system information of the first cell indicates that camping on the first cell is not allowed and an intra-frequency reselection is not allowed, the cell selection module determines whether the set condition is met; in a case that the specific indication information is invalid and in the case that the first system information of the first cell indicates that camping on the first cell is not allowed and an intra-frequency reselection is not allowed, the cell selection module does not select, or not reselect, or neither select nor reselect a cell on the first frequency.

In some optional embodiments, it is determined that the set condition is not met in a case that the UE is unable to obtain a PLMN to which the first cell belongs.

In some optional embodiments, the first system information is a master information block (MIB), and the second system information is a system information block (SIB 1).

According to a fourth aspect of the embodiments of the present disclosure, a network side device is provided.

In some optional embodiments, the network side device includes:
an information generating module, configured to generate first system information;
an information broadcasting module, configured to broadcast the first system information, where the first system information is system information of a first cell on a first frequency and includes first indication information, second indication information and third indication information, the first indication information is configured to indicate whether camping on the first cell by a UE is not allowed, the second indication information is configured to indicate whether an intra-frequency reselection of the UE is not allowed, the third indication information includes a valid state and an invalid state, the third indication information of the valid state is configured to indicate determining whether a set condition is met in a case that camping on the first cell is not allowed and an intra-frequency reselection of the UE is not allowed, and not selecting, or not reselecting, or neither selecting nor reselecting a cell on the first frequency, in a case that the set condition is met, the third indication information of the invalid state is configured to indicate not selecting, or not reselecting, or neither selecting nor reselecting a cell on the first frequency in the case that camping on the first cell is not allowed and an intra-frequency reselection of the UE is not allowed.

In some optional embodiments, the first system information is an MIB.

According to a fifth aspect of the embodiments of the present disclosure, a user equipment is provided, including a memory, a processor and a program stored in the memory and executable by the processor, where the processor executes the program to perform the method for cell selection hereinabove.

According to a sixth aspect of the embodiments of the present disclosure, a network side device is provided, including a memory, a processor and a program stored in the memory and executable by the processor, where the processor executes the program to perform the method for cell selection hereinabove.

The technical scheme provided by the embodiment of the disclosure has the following beneficial effects:

in a case that the first system information of the first cell on the first frequency indicates that camping on the first cell is not allowed and an intra-frequency reselection of the UE is not allowed, the first frequency is not directly set to be not selectable, not reselectable or neither selectable nor reselectable, but it is determined whether other conditions are meet. In an embodiment, only when the first system information of the first cell on the first frequency indicates that camping on the first cell is not allowed and an intra-frequency reselection of the UE is not allowed and a set condition is met, the cell on the first frequency is set to be not selectable, or not reselectable, or neither selectable nor reselectable, so that cells that can be selected, or reselected, or both selected and reselected on the first frequency are prevented from being missed.

It is to be understood that both the foregoing general description and the following detailed description are exemplary and explanatory only and are not restrictive of the disclosure.

BRIEF DESCRIPTION OF THE DRAWINGS

The drawings, which are incorporated in and constitute a part of this specification, illustrate embodiments consistent with the present disclosure and, together with the description, serve to explain the principles of the disclosure.

DETAILED DESCRIPTION

Figure 1:
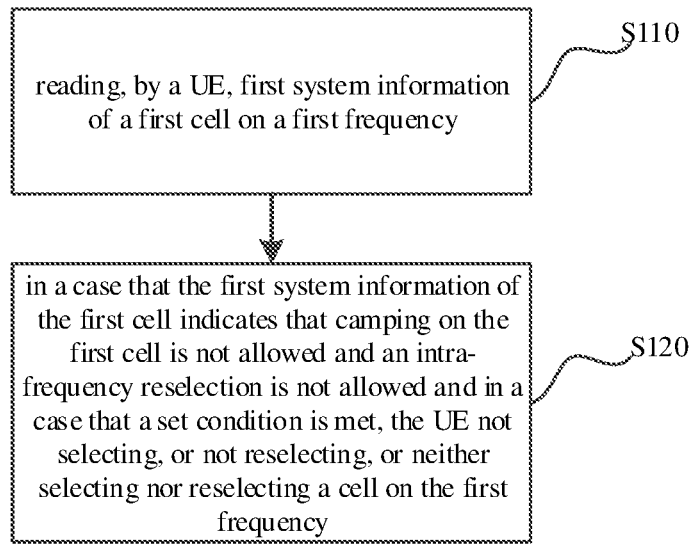
FIG. 1 is a flow diagram illustrating a method for cell selection in an embodiment.

The following description and the drawings sufficiently illustrate specific embodiments of the disclosure to enable those skilled in the art to practice them. Other embodiments may incorporate structural, logical, electrical, process, and other changes. The examples merely typify possible variations. Individual components and functions are optional unless explicitly required, and the sequence of operations may vary. Portions and features of some embodiments may be included in or substituted for those of others. The scope of embodiments of the present disclosure includes the full ambit of the claims, as well as all available equivalents of the claims. Embodiments may be referred to herein, individually or collectively, by the term "disclosure" merely for convenience and without intending to voluntarily limit the scope of this application to any single disclosure or disclosed concept if more than one is in fact disclosed. Herein, relational terms such as first and second, and the like may be used solely to distinguish one entity or action from another entity or action without necessarily requiring or implying any actual such relationship or order between such entities or actions. Also, the terms "includes," "including," or any other variation thereof, are intended to cover a non-exclusive inclusion, such that a process, method, or apparatus that includes a list of elements does not include only those elements but may include other elements not expressly listed or inherent to such process, method, or apparatus. Without further limitation, an element defined by the phrase "including an . . . . . . " does not exclude the presence of additional identical elements in the process, method or apparatus including the element. The various embodiments are described in a progressive manner, with each embodiment focusing on differences from the other embodiments, and with like parts being referred to one another. As for the method, the product and the like disclosed in the embodiment, the description is simple because the method corresponds to the method part disclosed in the embodiment, and the relevant parts can be referred to the method part for description.

The exemplary wireless communication systems and apparatus described below employ a wireless communication system that supports broadcast services. Wireless communication systems are widely deployed to provide various types of communication such as voice, data, and so on. These systems may be based on Code Division Multiple Access (CDMA), Time Division Multiple Access (TDMA), Orthogonal Frequency Division Multiple Access (OFDMA), 3GPP Long Term Evolution (LTE) wireless Access, 3GPP Long Term evolution advanced or LTE-advanced (Long Term evolution-advanced, LTE-a), 3GPP2 Ultra Mobile Broadband (UMB), World Interoperability for Microwave Access (WiMax), or some other modulation techniques.

When a UE in a wireless communication system in the present disclosure selects a cell:

the Access Stratum (AS) may report the acquired Public Land Mobile Network (PLMN) information to the NAS layer autonomously or based on a received Non-Access Stratum (NAS) command During the PLMN search in the AS layer, the UE scans all radio frequency channels (RF channels) one by one according to the device capability to find available PLMN information. At each scanned carrier frequency, the UE only needs to search for the cell with the strongest signal quality and read the system information to confirm the PLMN set to which the cell belongs, where a cell may belong to a single PLMN or multiple PLMNs. If the UE can read one or more PLMN IDs in the cell with the strongest signal quality, the UE needs to report each read PLMN ID to the NAS layer.

The NAS may inform the AS layer of the selected PLMN. The NAS may simultaneously provide the AS layer with an Equivalent PLMN list (Equivalent PLMN list), and the AS layer may perform cell selection, or cell reselection, or cell selection and reselection based on the selected PLMN and PLMNs in the Equivalent PLMN list.

Once the UE selects a PLMN, it needs to perform a cell selection procedure to select a suitable cell to camp on.

The system message of the LTE and NR cell includes a PLMN list to which the cell belongs.

Different operators correspond to different PLMNs.

In some cases, in order to prohibit UE from accessing or camping on the cell, the cell may broadcast a camping barring (e.g., cellBarred in NR) Information Element (IE) in the system Information. If the UE reads the system information and finds that the camping barring IE is set to be barred (e.g., cellBarred IE in NR is set to barred), the UE will avoid selecting the cell for a future period of time (with a time length of a preset value). When the UE finds that the camping barring IE is set to be barred, the UE determines whether other cells at the frequency of the cell can be selected according to an intra-frequency reselection (e.g., intraFreqReselection in NR) IE in the system message. If intra-frequency reselection is set to be barred (for example: intraFreqReselection IE in NR is set to notAllowed), the UE will avoid selecting other cells in the frequency of the cell for a future period of time (the time length is a preset value).

Optionally, when the cell belongs to the NR system, the setting the barring information element to barred includes one or more of the following in combination as true:
setting cellgared IE in the NR system as barred;
setting cellReservedForOperatorUse IE in the NR system as reserved;
setting the cellReservedForOtherUse IE in the NR system as reserved.

Optionally, when the cell belongs to the LTE system, the setting the barring information element to barred includes one or more of the following in combination as true:
setting cellgared IE in the LTE system as barred;
setting cellReservedForOperatorUse IE in the LTE system as reserved;
setting the cellReservedForOtherUse IE in the LTE system as reserved.

Optionally, when the cell belongs to the NR system, setting an intra-frequency reselection information element to be barred indicates that the following condition is true:
the intraFreqReselection IE in the NR system is set to notAllowed.

Optionally, when the cell belongs to the LTE system, setting an intra-frequency reselection information element to be barred indicates that the following condition is true:
the intraFreqReselection IE in the LTE system is set to notAllowed.

According to the standard content in the related art, when the camping barring is set to be barred, the UE judges whether an intra-frequency reselection is only based on intraFreqReselection IE without considering other IEs.

Description of cellbar IE: cellBarredENUMERATED {barred, notBarred}.

Description of intraFreqReselection IE: intrafreqReselectionUMERATED {allowed, notAllowed}.

For the NR cell, the cellbar IE and intraFreqReselection IE are located in a Master Information Block (MIB); for LTE cells, the cellbar IE and intraFreqReselection IE are located in a System Information Block (SIB) SIB 1.

A method for cell selection provided in embodiment as shown in FIG. 1 includes:

S110: reading, by a UE, first system information of a first cell on a first frequency;

S120: in a case that the first system information of the first cell indicates that camping on the first cell is not allowed and an intra-frequency reselection is not allowed and in a case that a set condition is met, the UE not selecting, or not reselecting, or neither selecting nor reselecting a cell on the first frequency.

When the first system information of the first cell on the first frequency indicates that camping on the first cell is not allowed and an intra-frequency reselection of the UE is not allowed, the first frequency is not directly set to be not selectable, not reselectable or neither selectable nor reselectable, but it is determined whether other conditions are meet. In an embodiment, only when the first system information of the first cell on the first frequency indicates that camping on the first cell is not allowed and an intra-frequency reselection of the UE is not allowed and a set condition is met, the cell on the first frequency is set to be not selectable, or not reselectable, or neither selectable nor reselectable, so that cells that can be selected, or reselected, or both selected and reselected on the first frequency are prevented from being missed.

Optionally, in step S120, the UE not selecting a cell on the first frequency includes: when the UE is powered on or does not camp on a cell, the UE not selecting a cell on the first frequency. The UE not reselecting a cell on the first frequency includes: when the UE is in an inter-cell switching scenario, the UE not reselecting a cell on the first frequency.

Optionally, the first frequency is at an Unlicensed Band, and the optional Unlicensed Band is a band of 2.4 GHz, 5 GHz, 37 GHz, 60 GHz, or the like; the present embodiment is also applicable to other bands, especially to the case where multiple operators use the same band.

Optionally, in step S120, the UE not selecting, or not reselecting, or neither selecting nor reselecting a cell on the first frequency includes: the UE not taking the cell on the first frequency as a candidate cell for cell selection, or cell reselection, or cell selection and reselection within a preset time period.

Optionally, the preset time period is 300 seconds from the time when the UE received and interpreted the corresponding system information.

Optionally, the first indication information is configured to indicate that camping on the first cell is not allowed, and the second indication information is configured to indicate an intra-frequency reselection of the UE is not allowed. The UE obtains the first indication information and the second indication information through a system message broadcasted by the first cell.

Optionally, the first indication information includes a cellbar identifier, and the second indication information includes an intraFreqReselection identifier. The UE may also obtain the first indication information and the second indication information in any other manner.

Optionally, the set condition is related to a preset PLMN set of the UE and a PLMN to which the first cell belongs.

Optionally, in step S120, in the case that the first system information of the first cell indicates that camping on the first cell is not allowed and an intra-frequency reselection is not allowed and prior to determining whether the set condition is met, the method further includes: reading, by the UE, second system information of the first cell, to obtain the PLMN to which the first cell belongs.

In the NR system, the first system information is an MIB and the second system information is an SIB 1.

Optionally, the set condition includes: at least one PLMN in the preset PLMN set of the UE is the same with at least one PLMN to which the first cell belongs.

By modifying the determination mechanism of triggering an intra-frequency reselection, the determination of whether the PLMN of the first cell is the same with the preset PLMN of the UE is taken as one of conditions of determining whether to perform an intra-frequency reselection. Compared with the prior art that whether an intra-frequency reselection is performed is determined only according to the indication of the cell, the method is more reasonable, and the situation that the UE cannot select or reselect the cell which the UE can camp on is avoided.

The PLMN to which the first cell belongs may be one PLMN, and may be a plurality of PLMNs. The PLMN to which the first cell belongs may also not be able to acquire, e.g., the NR cell only broadcasts the MIB and does not broadcast the SIB 1; or, the PLMN to which the cell belongs is an optional IE, so the cell does not broadcast the PLMN.

Optionally, when the UE cannot acquire the PLMN to which the cell belongs, the UE considers that the set condition is not met.

Optionally, the set condition includes: one PLMN in the preset PLMN set of the UE is the same with one PLMN broadcasted by the first cell to which the first cell belongs.

Optionally, the set condition includes: a plurality of PLMNs in the preset PLMN set of the UE are the same with one PLMN broadcasted by the first cell to which the first cell belongs.

Optionally, the set condition includes: a plurality of PLMNs in the preset PLMN set of the UE are the same with a plurality of PLMNs broadcasted by the first cell to which the first cell belongs.

The preset PLMN set of the UE includes, but is not limited to, one or more of the following combinations:
a selected PLMN of the UE,
a registered PLMN of the UE,
an Equivalent PLMN list of the UE,
a Home PLMN of the UE,
an Equivalent Home PLMN of the UE.

The preset PLMN set of the UE is specified by a protocol or configured by the network.

Optionally, if the UE detects that the set condition is not met, the UE may select another cell on the first frequency:
in the case that the first system information of the first cell indicates that camping on the first cell by the UE is not allowed and an intra-frequency reselection of the UE is not allowed and in a case that the set condition is not met, the UE taking other cells on the first frequency as candidate cells for cell selection, or cell reselection, or cell selection and reselection;
in a case that the first system information of the first cell indicates that camping on the first cell by the UE is allowed and in a case that the set condition is not met, the UE taking other cells on the first frequency as candidate cells for cell selection, or cell reselection, or cell selection and reselection.

When the first system information of the first cell on the first frequency indicates that camping on the first cell is not allowed and an intra-frequency reselection of the UE is not allowed, the first frequency is not directly set to be not selectable, not reselectable or neither selectable nor reselectable, but it is determined whether other conditions are meet. In the embodiment, when camping on the first cell is not allowed and an intra-frequency reselection of the UE is not allowed, and if the set condition is not met, another cell may be selected on the first frequency, thereby avoiding that another cell that may be camped on on the first frequency is missed.

Optionally, the UE is in an Idle state or Inactive state.

Optionally, prior to the determining whether the set condition is met at step S120, the method further includes:
reading, by the UE, specific indication information in first system information, in a case that the specific indication information is valid and in the case that the first system information of the first cell indicates that camping on the first cell is not allowed and an intra-frequency reselection is not allowed, determining, by the UE, whether the set condition is met; if the set condition is not met, selecting other cells on the first frequency; in a case that the specific indication information is invalid and in the case that the first system information of the first cell indicates that camping on the first cell is not allowed and an intra-frequency reselection is not allowed, the UE not selecting, or not reselecting, or neither selecting nor reselecting a cell on the first frequency.

Figure 2:
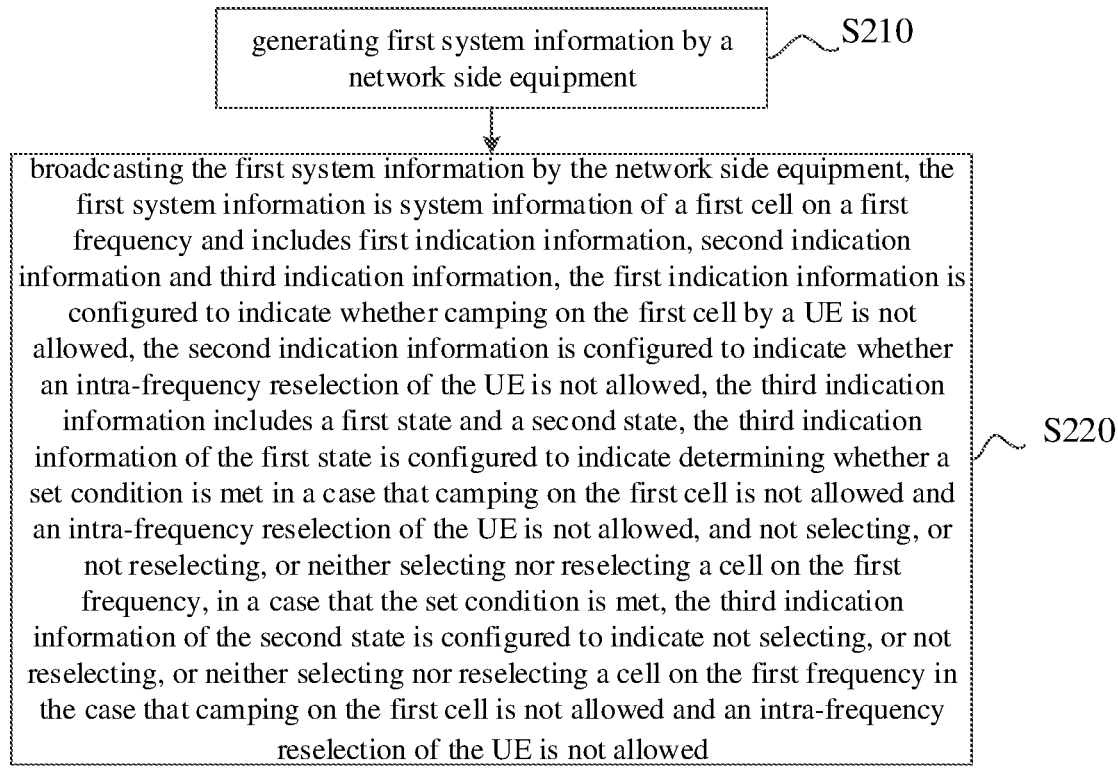
FIG. 2 is a flow diagram illustrating a method for cell selection in another embodiment.

As shown in FIG. 2, a method for cell selection is further provided in the present disclosure, including:

S210: generating first system information by a network side equipment;

S220: broadcasting the first system information by the network side equipment, the first system information is system information of a first cell on a first frequency and includes first indication information, second indication information and third indication information, the first indication information is configured to indicate whether camping on the first cell by a UE is not allowed, the second indication information is configured to indicate whether an intra-frequency reselection of the UE is not allowed, the third indication information includes a valid state (first state) and an invalid state (second state), the third indication information of the valid state is configured to indicate determining whether a set condition is met in a case that camping on the first cell is not allowed and an intra-frequency reselection of the UE is not allowed, and not selecting, or not reselecting, or neither selecting nor reselecting a cell on the first frequency, in a case that the set condition is met, the third indication information of the invalid state is configured to indicate not selecting, or not reselecting, or neither selecting nor reselecting a cell on the first frequency in the case that camping on the first cell is not allowed and an intra-frequency reselection of the UE is not allowed.

Optionally, when the first cell is an NR cell, the first system information is an MIB; when the first cell is an LTE cell, the first system information is an SIB 1.

Optionally, the third indication information is implemented by an indication bit in the first system information.

Optionally, when the indication bit is true, the indication information is valid, and indicates that in a case that the first system information of the first cell indicates that camping on the first cell is not allowed and an intra-frequency reselection of the UE is not allowed, in a case that a set condition is met, the UE does not select, or not reselect, or neither select nor reselect a cell on the first frequency; in a case that the set condition is not met, UE takes the cell on the first frequency as a candidate cell for cell selection, or cell reselection, or cell selection and reselection; when the indication bit is false, the indication information is invalid, and indicates that in a case that the first system information of the first cell indicates that camping on the first cell is not allowed and an intra-frequency reselection of the UE is not allowed, the UE does not select, or not reselect, or neither select nor reselect a cell on the first frequency.

Optionally, when the indication bit is false, the indication information is valid, and indicates that in a case that the first system information of the first cell indicates that camping on the first cell is not allowed and an intra-frequency reselection of the UE is not allowed, in a case that a set condition is met, the UE does not select, or not reselect, or neither select nor reselect a cell on the first frequency; in a case that the set condition is not met, UE takes the cell on the first frequency as a candidate cell for cell selection, or cell reselection, or cell selection and reselection; when the indication bit is true, the indication information is invalid, and indicates that in a case that the first system information of the first cell indicates that camping on the first cell is not allowed and an intra-frequency reselection of the UE is not allowed, the UE does not select, or not reselect, or neither select nor reselect a cell on the first frequency.

Optionally, the set condition is related to a preset PLMN set of the UE and a PLMN to which the first cell belongs.

Optionally, the set condition includes: at least one PLMN in the preset PLMN set of the UE is the same with at least one PLMN broadcasted by the first cell to which the first cell belongs.

The preset PLMN set of the UE includes, but is not limited to, one or more of the following combinations:
a selected PLMN of the UE,
a Registered PLMN of the UE,
an Equivalent PLMN list of the UE,
a Home PLMN of the UE,
an Equivalent Home PLMN of the UE.

The preset PLMN set of the UE is specified by a protocol or configured by the network.

In an exemplary embodiment, the preset PLMN set of the UE only includes a selected PLMN, the selected PLMN of the UE is PLMN A, and the cell selection process of the UE is as follows:

Step a1: the UE reads the broadcast message of the cell Cellx at the frequency A, learns that the broadcast message of the cell indicates that the cell is not allowed to be accessed, and selecting other cells at the same frequency is not allowed, and the Cellx belongs to PLMN B and C;

Step a2: the UE judges that the selected PLMN and the PLMN to which Cellx belongs are not the same;

Step a3: the UE considers that Cellx cannot be camped on, the network allows selecting other cells at the frequency A, and the other cells at the frequency A are used as candidate cells for cell selection and/or cell reselection by the UE.

In another embodiment, the preset PLMN set of the UE only includes a UE registered PLMN, the registered PLMN of the UE is PLMN A, and the cell selection process of the UE is as follows:

Step b1: the UE reads the broadcast message of the cell Cellx at the frequency A, learns that the broadcast message of the cell indicates that the cell is not allowed to be accessed, and selecting other cells at the same frequency is not allowed, and the Cellx belongs to PLMN B and C;

Step b2: the UE judges that the registered PLMN and the PLMN to which Cellx belongs are not the same;

Step b3: the UE considers that Cellx cannot be camped on, the network allows selecting other cells of the frequency A, and the other cells of the frequency A are used as candidate cells for cell selection and/or cell reselection by the UE.

In another exemplary embodiment, the preset PLMN set of the UE is a set consisting of UE registered PLMN and PLMNs in an Equivalent PLMN list, where the registered PLMN of the UE is PLMN A, the Equivalent PLMN list of the UE includes PLMNs D and E, and the cell selection process of the UE is as follows:

Step c1: the UE reads the broadcast message of the cell Cellx on the frequency A, learns that the broadcast message of the cell indicates that the cell is not allowed to be accessed, and selecting other cells at the same frequency is not allowed, and the Cellx belongs to PLMN B and C;

Step c2: the UE judges that the PLMNs in the registered PLMN and the Equivalent PLMN list are not the same with the PLMN to which the Cellx belongs;

Step c3: the UE considers that Cellx cannot be camped on, the network allows selecting other cells at the frequency A, and the other cells of the frequency A are used as candidate cells for cell selection and/or cell reselection by the UE.

In another exemplary embodiment, the preset PLMN set of the UE may be any case, for example: in the situation described in the foregoing embodiment, and the Cellx does not broadcast the PLMN to which the Cellx belongs, the cell selection process of the UE is as follows:

Step d1: the UE reads the broadcast message of the cell Cellx on the frequency A, learns that the broadcast message of the cell indicates that the cell is not allowed to be accessed, and selecting other cells at the same frequency is not allowed, and the Cellx does not broadcast the PLMN to which the Cellx belongs;

Step d2: the UE considers that Cellx cannot be camped on, the network allows selecting other cells at the frequency A, and the other cells of the frequency A are used as candidate cells for cell selection and/or cell reselection by the UE.

In another exemplary embodiment, the preset PLMN set of the UE only includes a selected PLMN, the selected PLMN of the UE is PLMN A, and the cell selection process of the UE is as follows:

Step e1: the UE reads the broadcast message of the Cellx on the frequency A, learns that the broadcast message of the Cellx indicates that the cell is not allowed to be accessed, and selecting other cells at the same frequency is not allowed, and the Cellx belongs to PLMN A and B;

Step e2: the UE judges that the selected PLMN is the same with the PLMN to which Cellx belongs;

Step e3: the UE considers that Cellx cannot be camped on, the network does not allow the UE to select other cells at the frequency A, and the cell at the frequency A is not taken as a candidate cell for cell selection and/or cell reselection by the UE within a period of time.

In another exemplary embodiment, the preset PLMN set of the UE only includes registered PLMN, the registered PLMN of the UE is PLMN A, and the cell selection process of the UE is as follows:

Step f1: the UE reads the broadcast message of the Cellx on the frequency A, acquires that the broadcast message of the Cellx indicates that the cell is not allowed to be accessed, and selecting other cells of the same frequency is not allowed, and the Cellx belongs to PLMN A and B;

Step f2: the UE judges that the registered PLMN of the UE is the same with the PLMN to which Cellx belongs;

Step f3: the UE considers that Cellx cannot be camped on, the network does not allow the UE to select other cells at the frequency A, and the cell at the frequency A is not taken as a candidate cell for cell selection and/or cell reselection by the UE within a period of time.

In another exemplary embodiment, the preset PLMN set of the UE is a set consisting of registered PLMN and PLMNs in an Equivalent PLMN list, where the registered PLMN of the UE is PLMN A, the Equivalent PLMN list of the UE includes PLMNs D and E, and the cell selection process of the UE is as follows:

Step g1: the UE reads the broadcast message of the Cellx at the frequency A, learns that the broadcast message of the cell indicates that the cell is not allowed to be accessed, and selecting other cells at the same frequency is not allowed, and the Cellx belongs to PLMN D;

Step g2: the UE judges that the PLMN in the Equivalent PLMN list is the same with the PLMN to which Cellx belongs;

Step g3: the UE considers that Cellx cannot be camped on, the network does not allow the UE to select other cells at the frequency A, and the cell at the frequency A is not taken as a candidate cell for cell selection and/or cell reselection by the UE within a period of time.

In another exemplary embodiment, the preset PLMN set of the UE only includes a selected PLMN, the selected PLMN of the UE is PLMN A, and the cell selection process of the UE is as follows:

Step h1: the UE reads the broadcast message of the Cellx on the frequency A, and learns that the broadcast message of the Cellx indicates that the cell is allowed to be accessed, and that the Cellx belongs to the PLMN B;

Step h2: the UE judges that the PLMN in the UE selected PLMN is inconsistent with the PLMN to which Cellx belongs;

Step h3: the UE considers that Cellx cannot be camped on, the network allows selecting other cells at the frequency A, and the other cells at the frequency A are used as candidate cells for cell selection and/or cell reselection by the UE.

In another exemplary embodiment, the preset PLMN set of the UE is a set consisting of registered PLMN and PLMNs in an Equivalent PLMN list, where the registered PLMN of the UE is PLMN A, the Equivalent PLMN list of the UE includes PLMNs D and E, and the cell selection process of the UE is as follows:

Step i1: the UE reads the broadcast message of the Cellx at the frequency A, and learns that the broadcast message of the Cellx indicates that the cell is allowed to be accessed, and that the Cellx belongs to the PLMN B;

Step i2: the UE judges that the PLMNs in the registered PLMN and the Equivalent PLMN list are not the same with the PLMN to which the Cellx belongs;

Step i3: the UE considers that Cellx cannot be camped on, the network allows selecting other cells at the frequency A, and the other cells at the frequency A are used as candidate cells for cell selection and/or cell reselection by the UE.

In another exemplary embodiment, the preset PLMN set of the UE only includes a selected PLMN, the selected PLMN of the UE is PLMN A, and the cell selection process of the UE is as follows:

Step j1: the UE reads the MIB of the broadcast message of the Cellx at the frequency A, learns that the broadcast message of the Cellx indicates that the cell is not allowed to be accessed, and selecting other cells at the same frequency is not allowed;

Step j2: the UE reads the SIB1 of the broadcast message of the Cellx at the frequency A to know that the Cellx belongs to the PLMN B;

Step j3: the UE judges that the PLMN in the UE selected PLMN is not the same with the PLMN to which Cellx belongs;

Step j4: the UE considers that Cellx cannot be camped on, the network allows selecting other cells at the frequency A, and the other cells at the frequency A are used as candidate cells for cell selection and/or cell reselection by the UE.

In another exemplary embodiment, the preset PLMN set of the UE only includes a selected PLMN, the selected PLMN of the UE is PLMN A, and the cell selection process of the UE is as follows:

Step k1: the UE reads the MIB of the broadcast message of the Cellx at the frequency A, learns that the broadcast message of the Cellx indicates that the cell is not allowed to be accessed, and selecting other cells at the same frequency is allowed;

Step k2: the UE considers that Cellx cannot reside, the network allows selecting other cells at the frequency A, and the other cells of the frequency A are used as candidate cells for cell selection and/or cell reselection by the UE.

In another exemplary embodiment, the preset PLMN set of the UE only includes a selected PLMN, the selected PLMN of the UE is PLMN a, and the cell selection process of the UE is as follows:

Step l1: the UE reads the MIB of the broadcast message of the Cellx at the frequency A, learns that the broadcast message of the Cellx indicates that the cell is not allowed to be accessed, selecting other cells at the same frequency is not allowed, learns that a specific indication bit of the MIB of the broadcast message of the Cellx is valid, previously appoints that the broadcast message of the cell indicates that the cell is not allowed to access, and when the other cells of the same frequency are not allowed to select and the specific indication bit is valid, the UE should judge whether the PLMN of the cell is consistent with the PLMN of the PLMN;

Step l2: the UE reads the SIB1 of the broadcast message of the Cellx at the frequency A to know that the Cellx belongs to the PLMN B;

Step l3: the UE judges that the PLMN in the UE selected PLMN is not the same with the PLMN to which Cellx belongs;

Step l4: the UE considers that Cellx cannot be camped on, the network allows selecting other cells at the frequency A, and the other cells at the frequency A are used as candidate cells for cell selection and/or cell reselection by the UE.

In another exemplary embodiment, the preset PLMN set of the UE only includes a selected PLMN, the selected PLMN of the UE is PLMN A, and the cell selection process of the UE is as follows:

Step m1: the UE reads the MIB of the broadcast message of the Cellx at the frequency A, learns that the broadcast message of the Cellx indicates that the cell is not allowed to be accessed, selecting other cells at the same frequency is not allowed, and learns that a specific indication bit of the MIB of the broadcast message of the Cellx is in an invalid state, and it is pre-agreed that the broadcast message of the cell indicates that the cell is not allowed to be accessed, selecting other cells at the same frequency is not allowed; in a case that the specific indication bit is in an invalid state, the UE does not need to judge whether the PLMN is the same with the PLMN of the cell.

Step m2: the UE considers that Cellx cannot be camped on, the network does not allow the UE to select other cells at the frequency A, and the cell at the frequency A is not taken as a candidate cell for cell selection and/or cell reselection by the UE within a period of time.

Figure 3:
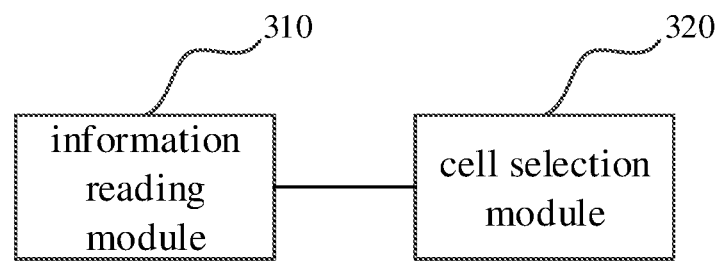
FIG. 3 is a block diagram of a user terminal in an embodiment.

As shown in FIG. 3, a user equipment provided by the present disclosure includes:

an information reading module 310, configured to read first system information of a first cell on a first frequency;

a cell selection module 320, configured to, in a case that the first system information of the first cell indicates that camping on the first cell is not allowed and an intra-frequency reselection is not allowed and in a case that a set condition is met, not select, or not reselect, or neither select nor reselect a cell on the first frequency.

Optionally, in a case that the cell selection module 320 is configured to not select, or not reselect, or neither select nor reselect the cell on the first frequency, further including: the UE not taking the cell on the first frequency as a candidate cell for cell selection, or cell reselection, or cell selection and reselection within a preset time period.

Optionally, the set condition is related to a preset PLMN set of the UE and a PLMN to which the first cell belongs.

Optionally, in the case that the first system information of the first cell indicates that camping on the first cell is not allowed and an intra-frequency reselection is not allowed and prior to determining whether the set condition is met, the cell selection module is configured to: read second system information of the first cell, to obtain the PLMN to which the first cell belongs.

Optionally, the set condition includes: at least one PLMN in the preset PLMN set of the UE is the same with at least one PLMN to which the first cell belongs.

By modifying the determination mechanism of triggering an intra-frequency reselection, the determination of whether the PLMN of the first cell is the same with the preset PLMN of the UE is taken as one of conditions of determining whether to perform an intra-frequency reselection. Compared with the prior art that whether an intra-frequency reselection is performed is determined only according to the indication of the cell, the method is more reasonable, and the situation that the UE cannot select or reselect the cell which the UE can camp on is avoided.

Optionally, the set condition includes: one PLMN in the preset PLMN set of the UE is the same with one PLMN to which the first cell belongs.

Optionally, the preset PLMN set of the UE includes at least one or more of: a selected PLMN of the UE, a registered PLMN of the UE, a PLMN in an equivalent PLMN list of the UE, a home PLMN of the UE, and an equivalent home PLMN of the UE.

Optionally, the cell selection module 320 is further configured to: in the case that the first system information of the first cell indicates that camping on the first cell is not allowed and an intra-frequency reselection of the UE is not allowed and in a case that the set condition is not met, take other cells on the first frequency as candidate cells for cell selection, or cell reselection, or cell selection and reselection.

Optionally, the cell selection module 320 is further configured to: in a case that the first system information of the first cell indicates that camping on the first cell is allowed and in a case that the set condition is not met, take other cells on the first frequency as candidate cells for cell selection, or cell reselection, or cell selection and reselection.

Optionally, the UE is in an Idle state or an Inactive state.

Optionally, the first frequency is in an unlicensed band.

Optionally, the information reading module 310 is configured to read specific indication information in first system information, in a case that the specific indication information is valid and in the case that the first system information of the first cell indicates that camping on the first cell is not allowed and an intra-frequency reselection is not allowed, the cell selection module 320 determines whether the set condition is met; in a case that the specific indication information is invalid and in the case that the first system information of the first cell indicates that camping on the first cell is not allowed and an intra-frequency reselection is not allowed, the cell selection module 320 does not select, or not reselect, or neither select nor reselect a cell on the first frequency.

Figure 4:
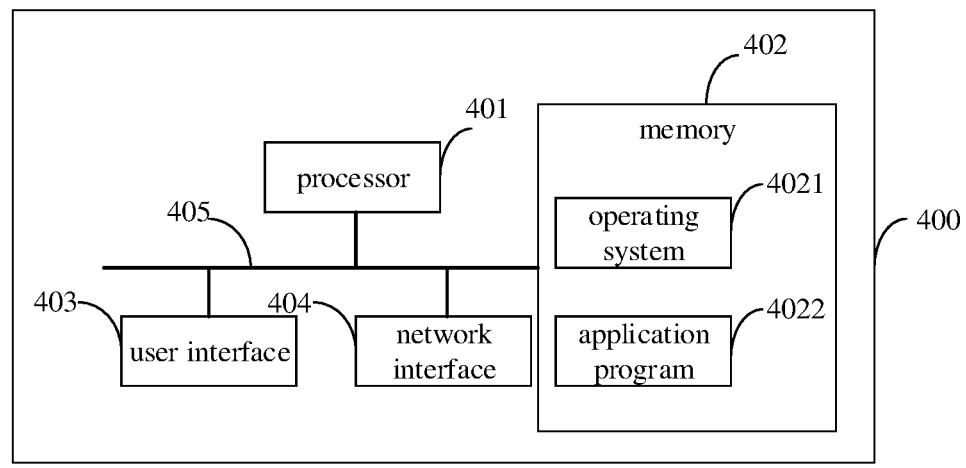
FIG. 4 is a block diagram illustrating a structure of a user terminal in an embodiment.

As shown in FIG. 4, a user equipment 400 provided by the present disclosure includes: at least one processor 401, memory 402, at least one network interface 404, and other user interfaces 403. The various components in the user equipment 400 are coupled together by a bus system 405. It is understood that the bus system 405 is used to enable connection communications between these components. The bus system 405 includes a power bus, a control bus, and a status signal bus in addition to a data bus. For clarity of illustration, however, the various buses are designated as the bus system 405 in FIG. 4.

The user interface 403 may include, among other things, a display, a keyboard, or a pointing device (e.g., a mouse, trackball (trackball), touch pad or touch screen, etc.).

It will be appreciated that the memory 402 in embodiments of the present disclosure can be either volatile memory or nonvolatile memory, or can include both volatile and nonvolatile memory. The non-volatile Memory may be a Read-Only Memory (ROM), a Programmable ROM (PROM), an Erasable PROM (EPROM), an Electrically Erasable PROM (EEPROM), or a flash Memory. The volatile Memory may be a Random Access Memory (RAM) which serves as an external cache. By way of example, but not limitation, many forms of R.A.M are available, such as Static random access memory (Static RAM, SRAM), Dynamic random access memory (Dynamic RAM, DRAM), Synchronous Dynamic random access memory (Synchronous DRAM, SDRAM), Double Data Rate Synchronous Dynamic random access memory (Double Data Rate SDRAM, DDRSDRAM), Enhanced Synchronous Dynamic random access memory (Enhanced SDRAM, ESDRAM), Synchronous link Dynamic random access memory (Synchlink DRAM, SLDRAM), and Direct memory bus random access memory (Direct Rambus RAM, DRRAM). The memory 402 of the systems and methods described in this disclosure is intended to include, without being limited to, these and any other suitable types of memory.

In some embodiments, memory 402 stores the following elements, executable modules or data structures, or a subset thereof, or an expanded set thereof: an operating system 4021 and application programs 4022.

The operating system 4021 includes various system programs, such as a framework layer, a core library layer, and a driver layer, and is configured to implement various basic services and process hardware-based tasks. The application 4022 includes various applications, such as a Media Player, a Browser, and the like, and is used to implement various application services. A program for implementing the method of an embodiment of the present disclosure may be included in the application 4022.

In the embodiment of the present disclosure, by calling a program or an instruction stored in the memory 402, specifically, the program or the instruction stored in the application 4022, the processor 401 is configured to: read the first system information of the first cell on the first frequency; and when the first system information of the first cell indicates that camping on the first cell is not allowed and an intra-frequency reselection is not allowed, if a set condition is met, not select, or not reselect, or neither select nor reselect a cell on the first frequency.

The method disclosed by the embodiment of the present disclosure may be applied to the processor 401, or implemented by the processor 401. The processor 401 may be an integrated circuit chip having signal processing capabilities.

In implementation, the steps of the above method may be performed by instructions in the form of hardware integrated logic circuits or software in the processor 401. The Processor 401 may be a general purpose Processor, a Digital Signal Processor (DSP), an Application Specific Integrated Circuit (ASIC), a Field Programmable Gate Array (FPGA) or other Programmable logic device, discrete Gate or transistor logic device, or discrete hardware components. The various methods, steps, and logic blocks disclosed in the embodiments of the present disclosure may be implemented or performed. A general purpose processor may be a microprocessor or the processor may be any conventional processor or the like. The steps of the method disclosed in connection with the embodiments of the present disclosure may be directly implemented by a hardware decoding processor, or implemented by a combination of hardware and software modules in the decoding processor. The software modules may be located in RAM, flash, ROM, PROM, or EPROM, registers, etc. as is well known in the art. The storage medium is located in the memory 402, and the processor 401 reads the information in the memory 402, and combines the hardware thereof to complete the steps of the method.

It is to be understood that the embodiments described in connection with the embodiments of the present disclosure may be implemented in hardware, software, firmware, middleware, microcode, or a combination thereof. For a hardware implementation, the processing units may be implemented within one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), general purpose processors, controllers, microcontrollers, microprocessors, other electronic units designed to perform the functions described in this disclosure, or a combination thereof.

For a software implementation, the techniques described in the embodiments of the present disclosure may be implemented with modules (e.g., procedures, functions, and so on) that perform the functions described in the embodiments of the present disclosure. The software codes may be stored in a memory and executed by a processor. The memory may be implemented within the processor or external to the processor.

Optionally, the processor 401 is configured to: not take the cell on the first frequency as a candidate cell for cell selection, or cell reselection, or cell selection and reselection within a preset time period.

Optionally, the set condition is related to a preset PLMN set of the UE and a PLMN to which the first cell belongs.

Optionally, in the case that the processor 401 determines that the first system information of the first cell indicates that camping on the first cell is not allowed and an intra-frequency reselection is not allowed and prior to determining whether the set condition is met, the processor 401 is further configured to: read second system information of the first cell, to obtain the PLMN to which the first cell belongs.

Optionally, the set condition includes: at least one PLMN in the preset PLMN set of the UE is the same with at least one PLMN to which the first cell belongs.

By modifying the determination mechanism of triggering an intra-frequency reselection, the determination of whether the PLMN of the first cell is the same with the preset PLMN of the UE is taken as one of conditions of determining whether to perform an intra-frequency reselection. Compared with the prior art that whether an intra-frequency reselection is performed is determined only according to the indication of the cell, the method is more reasonable, and the situation that the UE cannot select or reselect the cell which the UE can camp on is avoided.

Optionally, the preset PLMN set of the UE includes at least one or more of: a selected PLMN of the UE, a registered PLMN of the UE, a PLMN in an equivalent PLMN list of the UE, a home PLMN of the UE, and an equivalent home PLMN of the UE.

Optionally, the processor 401 is further configured to: in the case that the first system information of the first cell indicates that camping on the first cell is not allowed and an intra-frequency reselection of the UE is not allowed and in a case that the set condition is not met, take other cells on the first frequency as candidate cells for cell selection, or cell reselection, or cell selection and reselection.

Optionally, the processor 401 is further configured to: in a case that the first system information of the first cell indicates that camping on the first cell is allowed and in a case that the set condition is not met, take other cells on the first frequency as candidate cells for cell selection, or cell reselection, or cell selection and reselection.

Optionally, the UE is in an Idle state or an Inactive state.

Optionally, the first frequency is in an unlicensed band.

Optionally, the processor 401 is configured to read specific indication information in first system information, in a case that the specific indication information is valid and in the case that the first system information of the first cell indicates that camping on the first cell is not allowed and an intra-frequency reselection is not allowed, determine whether the set condition is met; in a case that the specific indication information is invalid and in the case that the first system information of the first cell indicates that camping on the first cell is not allowed and an intra-frequency reselection is not allowed, not select, or not reselect, or neither select nor reselect a cell on the first frequency.

Figure 5:
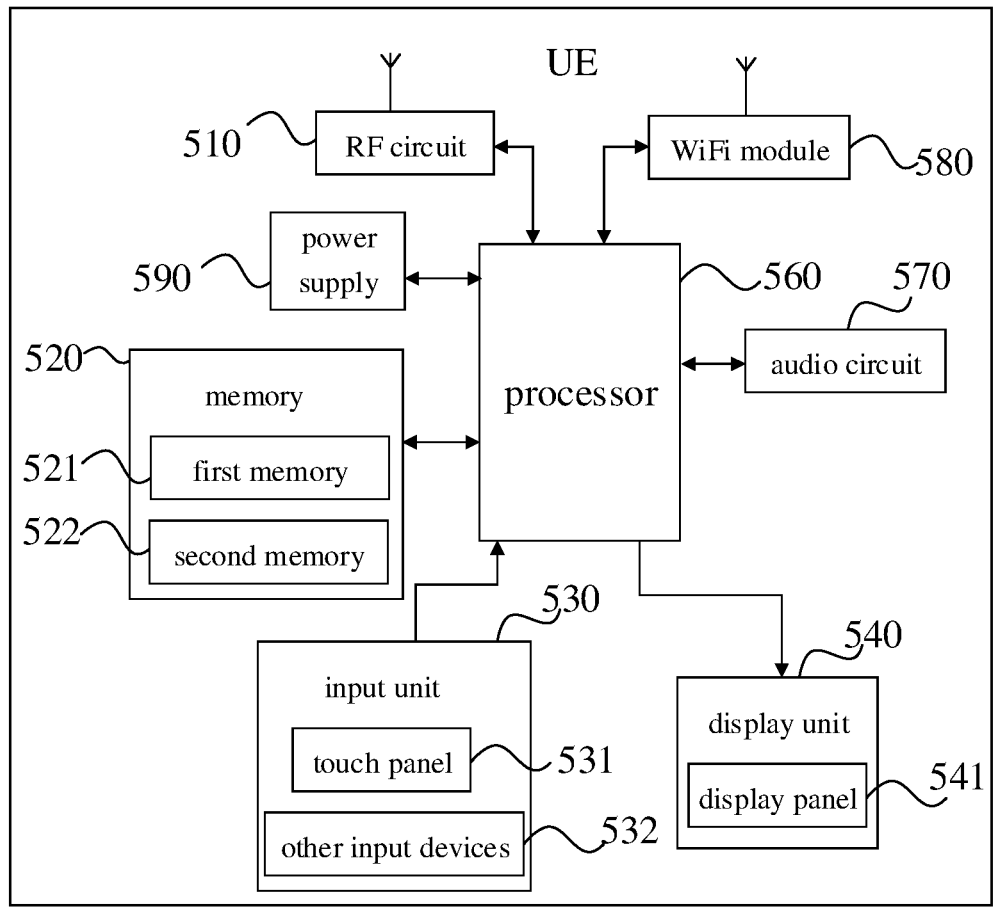
FIG. 5 is a block diagram illustrating a structure of a user terminal in another embodiment.

FIG. 5 is a schematic structural diagram of a user equipment provided in the present disclosure, specifically, the user equipment 500 in FIG. 5 may be a mobile phone, a tablet computer, a Personal Digital Assistant (PDA), or a vehicle-mounted computer.

The user equipment 500 in FIG. 5 includes a Radio Frequency (RF) circuit 510, a memory 520, an input unit 530, a display unit 540, a processor 560, an audio circuit 570, a WiFi (Wireless Fidelity) module 580, and a power supply 590.

The input unit 530 may be used to receive numeric or character information input by a user and generate signal inputs related to user settings and function control of the user equipment 500, among other things. Specifically, in the embodiment of the present disclosure, the input unit 530 may include a touch panel 531. The touch panel 531, also called a touch screen, can collect touch operations (such as operations of a user on the touch panel 531 by using a finger, a stylus pen, or any other suitable object or accessory) on or near the touch panel 531, and drive the corresponding connection device according to a preset program. Alternatively, the touch panel 531 may include two parts, a touch detection device and a touch controller. The touch detection device detects the touch direction of a user, detects a signal brought by touch operation and transmits the signal to the touch controller; the touch controller receives touch information from the touch sensing device, converts the touch information into touch point coordinates, sends the touch point coordinates to the processor 560, and receives and executes commands sent from the processor 560. In addition, the touch panel 531 may be implemented by various types such as a resistive type, a capacitive type, an infrared ray, and a surface acoustic wave. In addition to the touch panel 531, the input unit 530 may further include other input devices 532, and the other input devices 532 may include, but are not limited to, one or more of a physical keyboard, function keys (such as volume control keys, switch keys, etc.), a trackball, a mouse, a joystick, and the like.

Among other things, the display unit 540 may be used to display information input by the user or information provided to the user and various menu interfaces of the user equipment 500. The Display unit 540 may include a display panel 541, and optionally, the display panel 541 may be configured in the form of a Liquid Crystal Display (LCD) or an Organic Light-Emitting Diode (OLED).

It should be noted that the touch panel 531 may cover the display panel 541 to form a touch display screen, and when the touch display screen detects a touch operation thereon or nearby, the touch display screen is transmitted to the processor 560 to determine the type of the touch event, and then the processor 560 provides a corresponding visual output on the touch display screen according to the type of the touch event.

The touch display screen includes an application program interface display area and a common control display area. The arrangement of the application program interface display area and the common control display area is not limited, and may be an arrangement that can distinguish two display areas, such as an up-down arrangement, a left-right arrangement, and the like. The application interface display area may be used to display an interface of an application. Each interface may contain at least one application icon and/or widget desktop control or like interface element. The application interface display area may also be an empty interface that does not contain any content. The common control display area is used for displaying controls with high utilization rate, such as application icons like setting buttons, interface numbers, scroll bars and phone book icons.

The processor 560 is a control center of the user equipment 500, connects various parts of the entire cellular phone using various interfaces and lines, performs various functions of the user equipment 500 and processes data by operating or executing software programs and/or modules stored in the first memory 521 and calling data stored in the second memory 522, thereby integrally monitoring the user equipment 500. Optionally, processor 560 may include one or more processing units.

In the embodiment of the present disclosure, by calling a software program and/or a module stored in the first memory 521 and/or data stored in the second memory 522, the processor 560 is configured to: read the first system information of the first cell on the first frequency; and when the first system information of the first cell indicates that camping on the first cell is not allowed and an intra-frequency reselection is not allowed, if a set condition is met, not select, or not reselect, or neither select nor reselect a cell on the first frequency.

Optionally, the processor 560 is configured to: not take the cell on the first frequency as a candidate cell for cell selection, or cell reselection, or cell selection and reselection within a preset time period.

Optionally, the set condition is related to a preset PLMN set of the UE and a PLMN to which the first cell belongs.

Optionally, in the case that the processor 560 determines that the first system information of the first cell indicates that camping on the first cell is not allowed and an intra-frequency reselection is not allowed and prior to determining whether the set condition is met, the processor 560 is further configured to: read second system information of the first cell, to obtain the PLMN to which the first cell belongs.

Optionally, the set condition includes: at least one PLMN in the preset PLMN set of the UE is the same with at least one PLMN to which the first cell belongs.

By modifying the determination mechanism of triggering an intra-frequency reselection, the determination of whether the PLMN of the first cell is the same with the preset PLMN of the UE is taken as one of conditions of determining whether to perform an intra-frequency reselection. Compared with the prior art that whether an intra-frequency reselection is performed is determined only according to the indication of the cell, the method is more reasonable, and the situation that the UE cannot select or reselect the cell which the UE can camp on is avoided.

Optionally, the preset PLMN set of the UE includes at least one or more of: a selected PLMN of the UE, a registered PLMN of the UE, a PLMN in an equivalent PLMN list of the UE, a home PLMN of the UE, and an equivalent home PLMN of the UE.

Optionally, the processor 560 is further configured to: in the case that the first system information of the first cell indicates that camping on the first cell is not allowed and an intra-frequency reselection of the UE is not allowed and in a case that the set condition is not met, take other cells on the first frequency as candidate cells for cell selection, or cell reselection, or cell selection and reselection.

Optionally, the processor 560 is further configured to: in a case that the first system information of the first cell indicates that camping on the first cell is allowed and in a case that the set condition is not met, take other cells on the first frequency as candidate cells for cell selection, or cell reselection, or cell selection and reselection.

Optionally, the UE is in an Idle state or an Inactive state.

Optionally, the first frequency is in an unlicensed band.

Optionally, the processor 560 is configured to read specific indication information in first system information, in a case that the specific indication information is valid and in the case that the first system information of the first cell indicates that camping on the first cell is not allowed and an intra-frequency reselection is not allowed, determine whether the set condition is met; in a case that the specific indication information is invalid and in the case that the first system information of the first cell indicates that camping on the first cell is not allowed and an intra-frequency reselection is not allowed, not select, or not reselect, or neither select nor reselect a cell on the first frequency.

Figure 6:
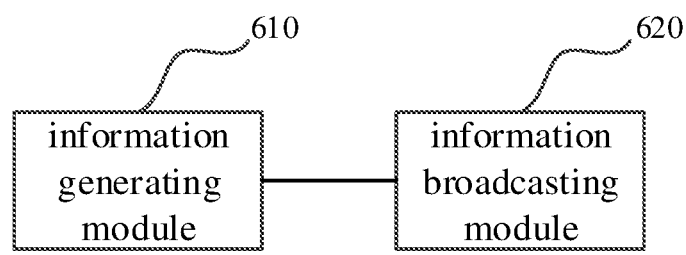
FIG. 6 is a block diagram illustrating a network side device in an embodiment.

As shown in FIG. 6, the present disclosure also provides a network side device including:

an information generating module 610, configured to generate first system information;

an information broadcasting module 620, configured to broadcast the first system information, where the first system information is system information of a first cell on a first frequency and includes first indication information, second indication information and third indication information, the first indication information is configured to indicate whether camping on the first cell by a UE is not allowed, the second indication information is configured to indicate whether an intra-frequency reselection of the UE is not allowed, the third indication information includes a valid state and an invalid state, the third indication information of the valid state is configured to indicate determining whether a set condition is met in a case that camping on the first cell is not allowed and an intra-frequency reselection of the UE is not allowed, and not selecting, or not reselecting, or neither selecting nor reselecting a cell on the first frequency, in a case that the set condition is met, the third indication information of the invalid state is configured to indicate not selecting, or not reselecting, or neither selecting nor reselecting a cell on the first frequency in the case that camping on the first cell is not allowed and an intra-frequency reselection of the UE is not allowed.

Optionally, the first system information is MIB.

Optionally, the first indication information includes a cellbar identifier, and the second indication information includes an intraFreqReselection identifier.

Optionally, the set condition is related to a preset PLMN set of the UE and a PLMN to which the first cell belongs.

Optionally, the set condition includes: at least one PLMN in the preset PLMN set of the UE is the same with at least one PLMN broadcasted by the first cell to which the first cell belongs.

The preset PLMN set of the UE includes, but is not limited to, one or more of the following combinations:
a selected PLMN of the UE,
a registered PLMN of the UE,
an Equivalent PLMN list of the UE,
a Home PLMN of the UE,
an Equivalent Home PLMN of the UE.

The preset PLMN set for the UE is specified by a protocol or configured by the network.

Figure 7:
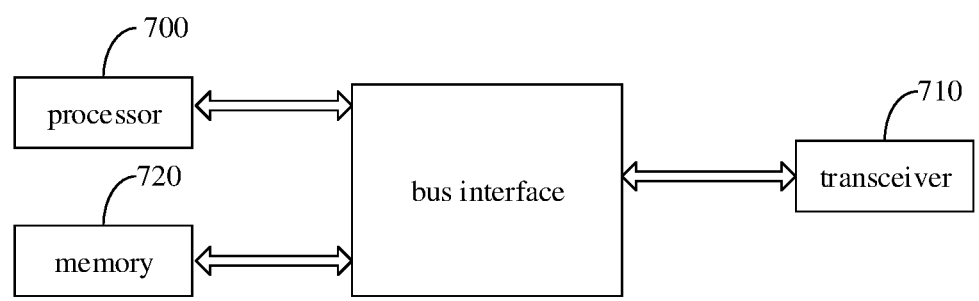
FIG. 7 is a block diagram illustrating a configuration of a network side device in an embodiment.

As shown in FIG. 7, a network side device provided by the present disclosure includes: a processor 700; a memory 720 connected to the processor 700 through a bus interface, and a transceiver 710 connected to the processor 700 through a bus interface; the memory 720 is used for storing programs and data used by the processor in performing operations; transmitting data information or pilot frequency through the transceiver 710, and also receiving an uplink control channel through the transceiver 710; the processor 700 calls and executes the programs and data stored in the memory 720 to: generate first system information; broadcast the first system information, where the first system information is system information of a first cell on a first frequency and includes first indication information, second indication information and third indication information, the first indication information is configured to indicate whether camping on the first cell by a UE is not allowed, the second indication information is configured to indicate whether an intra-frequency reselection of the UE is not allowed, the third indication information includes a valid state and an invalid state, the third indication information of the valid state is configured to indicate determining whether a set condition is met in a case that camping on the first cell is not allowed and an intra-frequency reselection of the UE is not allowed, and not selecting, or not reselecting, or neither selecting nor reselecting a cell on the first frequency, in a case that the set condition is met, the third indication information of the invalid state is configured to indicate not selecting, or not reselecting, or neither selecting nor reselecting a cell on the first frequency in the case that camping on the first cell is not allowed and an intra-frequency reselection of the UE is not allowed.

The transceiver 710 is configured to receive and transmit data under the control of the processor 700, and in this embodiment, is configured to transmit first system information.

Optionally, the network side device is a base station.

Optionally, the first indication information includes a cellbar identifier, and the second indication information includes an intraFreqReselection identifier.

Optionally, the set condition is related to a preset PLMN set of the UE and a PLMN to which the first cell belongs.

Optionally, the set condition includes: at least one PLMN in the preset PLMN set of the UE is the same with at least one PLMN broadcasted by the first cell to which the first cell belongs.

The preset PLMN set of the UE includes, but is not limited to, one or more of the following combinations:
a selected PLMN of the UE,
a registered PLMN of the UE,
an Equivalent PLMN list of the UE,
a Home PLMN of the UE,
an Equivalent Home PLMN of the UE.

The preset PLMN set for the UE is specified by a protocol or configured by the network.

Those of skill in the art would appreciate that the various illustrative elements and algorithm steps described in connection with the embodiments disclosed herein may be implemented as electronic hardware, or combinations of computer software and electronic hardware. Whether such functionality is implemented as hardware or software depends upon the particular application and design constraints imposed on the technical solution. Skilled artisans may implement the described functionality in varying ways for each particular application, but such implementation decisions should not be interpreted as causing a departure from the scope of the present disclosure. It can be clearly understood by those skilled in the art that, for convenience and simplicity of description, the specific working processes of the above-described systems, apparatuses and units may refer to the corresponding processes in the foregoing method embodiments, and are not described herein again.

In the embodiments disclosed herein, it should be understood that the disclosed methods, products (including but not limited to devices, apparatuses, etc.) may be implemented in other ways. For example, the above-described apparatus embodiments are merely illustrative, and for example, the division of the units is only one type of logical functional division, and other divisions may be realized in practice, for example, multiple units or components may be combined or integrated into another system, or some features may be omitted, or not executed. In addition, the shown or discussed mutual coupling or direct coupling or communication connection may be an indirect coupling or communication connection through some interfaces, devices or units, and may be in an electrical, mechanical or other form. The units described as separate parts may or may not be physically separate, and parts displayed as units may or may not be physical units, may be located in one position, or may be distributed on multiple network units. Some or all of the units can be selected according to actual needs to achieve the purpose of the solution of the embodiment. In addition, functional units in the embodiments of the present disclosure may be integrated into one processing unit, or each unit may exist alone physically, or two or more units are integrated into one unit.

It should be understood that the flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. The present disclosure is not limited to the procedures and structures described above and shown in the drawings, and various modifications and changes may be made without departing from the scope thereof. The scope of the present disclosure is limited only by the claims.

What is claimed is:

1. A method for cell selection or reselection, comprising:
   obtaining, by a user equipment (UE), first system information of a first cell on a first frequency;
   in a case that the first system information of the first cell indicates that camping on the first cell is not allowed and an intra-frequency reselection is not allowed and in a case that a set condition is met, the UE not selecting, or not reselecting, or neither selecting nor reselecting a cell on the first frequency;
   wherein the set condition is related to a preset PLMN set of the UE and a PLMN to which the first cell belongs;
   wherein the set condition comprises: at least one PLMN in the preset PLMN set of the UE is the same with at least one PLMN to which the first cell belongs.

2. The method according to claim 1, wherein in the case that the first system information of the first cell indicates that camping on the first cell is not allowed and an intra-frequency reselection is not allowed and prior to determining whether the set condition is met, the method further comprises:
   obtaining, by the UE, second system information of the first cell, to obtain the PLMN to which the first cell belongs.

3. The method according to claim 1, wherein the preset PLMN set of the UE comprises at least one or more of: a selected PLMN of the UE, a registered PLMN of the UE, one or more PLMNs in an equivalent PLMN list of the UE, a home PLMN of the UE, and an equivalent home PLMN of the UE.

4. The method according to claim 1, further comprising:
   in the case that the first system information of the first cell indicates that camping on the first cell is not allowed and an intra-frequency reselection of the UE is not allowed and in a case that the set condition is not met, the UE taking other cells on the first frequency as candidate cells for cell selection, or cell reselection, or cell selection and reselection.

5. The method according to claim 1, further comprising:
   in a case that the first system information of the first cell indicates that camping on the first cell by the UE is allowed and in a case that the set condition is not met, the UE taking other cells on the first frequency as candidate cells for cell selection, or cell reselection, or cell selection and reselection.

6. The method according to claim 1, wherein the UE is in an Idle state or an Inactive state;
   the first frequency is in an unlicensed band.

7. The method according to claim 1, wherein prior to determining whether the set condition is met, the method further comprises:
   obtaining, by the UE, specific indication information in first system information,
   in a case that the specific indication information is valid and in the case that the first system information of the first cell indicates that camping on the first cell is not allowed and an intra-frequency reselection is not allowed, determining, by the UE, whether the set condition is met;
   in a case that the specific indication information is invalid and in the case that the first system information of the first cell indicates that camping on the first cell is not allowed and an intra-frequency reselection is not allowed, the UE not selecting, or not reselecting, or neither selecting nor reselecting a cell on the first frequency.

8. The method according to claim 1, wherein the UE not selecting, or not reselecting, or neither selecting nor reselecting the cell on the first frequency comprises: the UE not taking the cell on the first frequency as a candidate cell for cell selection, or cell reselection, or cell selection and reselection within a preset time period.

9. The method according to claim 1, wherein it is determined that the set condition is not met in a case that the UE is unable to obtain a PLMN to which the first cell belongs.

10. The method according to claim 2, wherein the first system information is a master information block (MIB), and the second system information is a system information block (SIB 1).

11. A method for cell selection or reselection, comprising:
    generating first system information by a network side equipment;
    broadcasting the first system information by the network side equipment, wherein
    the first system information is system information of a first cell on a first frequency and comprises first indication information, second indication information and third indication information,
    the first indication information is configured to indicate whether camping on the first cell by a UE is not allowed,
    the second indication information is configured to indicate whether an intra-frequency reselection of the UE is not allowed,
    the third indication information comprises a valid state and an invalid state,
    the third indication information of the valid state is configured to indicate determining whether a set condition is met in a case that camping on the first cell is not allowed and an intra-frequency reselection of the UE is not allowed, and not selecting, or not reselecting, or neither selecting nor reselecting a cell on the first frequency, in a case that the set condition is met,
    the third indication information of the invalid state is configured to indicate not selecting, or not reselecting, or neither selecting nor reselecting a cell on the first frequency in the case that camping on the first cell is not allowed and an intra-frequency reselection of the UE is not allowed;
    wherein the set condition is related to a preset PLMN set of the UE and a PLMN to which the first cell belongs;
    wherein the set condition comprises: at least one PLMN in the preset PLMN set of the UE is the same with at least one PLMN to which the first cell belongs.

12. A user equipment, comprising: a memory, a processor and a program stored in the memory and executable by the processor, wherein the processor executes the program to:
    obtain first system information of a first cell on a first frequency;
    in a case that the first system information of the first cell indicates that camping on the first cell is not allowed and an intra-frequency reselection is not allowed and in a case that a set condition is met, not select, or not reselect, or neither select nor reselect a cell on the first frequency;

wherein the set condition is related to a preset PLMN set of the UE and a PLMN to which the first cell belongs;

wherein the set condition comprises: at least one PLMN in the preset PLMN set of the UE is the same with at least one PLMN to which the first cell belongs.

13. The user equipment according to claim 12, wherein the processor executes the program to: in the case that the first system information of the first cell indicates that camping on the first cell is not allowed and an intra-frequency reselection is not allowed and prior to determining whether the set condition is met, obtain second system information of the first cell, to obtain the PLMN to which the first cell belongs.

14. The user equipment according to claim 12, wherein the preset PLMN set of the UE comprises at least one or more of: a selected PLMN of the UE, a registered PLMN of the UE, one or more PLMNs in an equivalent PLMN list of the UE, a home PLMN of the UE, and an equivalent home PLMN of the UE.

15. The user equipment according to claim 12, wherein the processor executes the program to:

in the case that the first system information of the first cell indicates that camping on the first cell is not allowed and an intra-frequency reselection of the UE is not allowed and in a case that the set condition is not met, take other cells on the first frequency as candidate cells for cell selection, or cell reselection, or cell selection and reselection.

16. The user equipment according to claim 12, wherein the UE is in an Idle state or an Inactive state;

the first frequency is in an unlicensed band.

17. The user equipment according to claim 12, wherein the processor executes the program to: not take the cell on the first frequency as a candidate cell for cell selection, or cell reselection, or cell selection and reselection within a preset time period.

* * * * *